H. J. LEONARD.
COUPLING FOR HARNESS AND THE LIKE.
APPLICATION FILED SEPT. 7, 1917.
1,269,618.
Patented June 18, 1918.
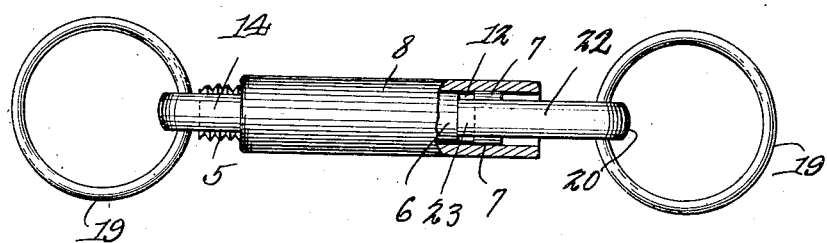
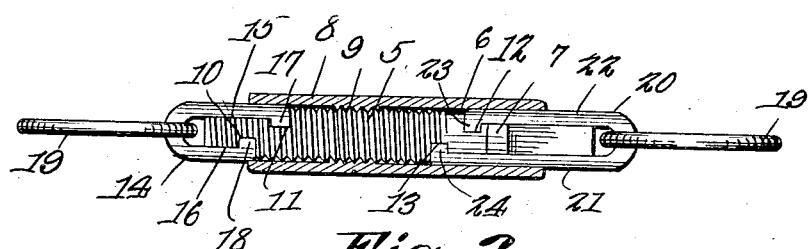

UNITED STATES PATENT OFFICE.

HUGH J. LEONARD, OF BIG LAKE, ARKANSAS.

COUPLING FOR HARNESS AND THE LIKE.

1,269,618.  Specification of Letters Patent.  Patented June 18, 1918.

Application filed September 7, 1917. Serial No. 190,163.

*To all whom it may concern:*

Be it known that I, HUGH J. LEONARD, a citizen of the United States of America, and resident of Big Lake, in the county of Mississippi and State of Arkansas, have invented certain new and useful Improvements in Couplings for Harness and the like, of which the following is a specification.

This invention relates to couplings or connections for harness and the like which are designed to be substituted for snap hooks or other couplings now in common use on harness and the like, the said invention having for its object the provision of novel means whereby one part of a harness or rigging may be coupled to another part and secured against accidental displacement, said invention lending itself to a ready manipulation of the parts whereby the same may be applied and removed speedily and without the exercise of undue care.

It has been found in practice that the parts may be connected and disconnected with practically the same despatch as a snap hook may be manipulated, whereas it has added advantages such as strength and durability and the quality of being safe so that a guard is afforded which will prevent accidental disengagement or dislodgment of the connected parts.

A further object of this invention is to provide a coupling of the character indicated which will be comparatively inexpensive and which is capable of use in connection with various sizes of members, within predetermined bounds, with which it coacts.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of a coupling embodying the invention, the same being partly in section; and Fig. 2 illustrates a sectional view of the sleeve constituting a part of the invention with the interior mechanism in elevation.

In these drawings 5 denotes a threaded shank which preferably has an unthreaded portion 6 near one end but in the present embodiment of the invention, this unthreaded portion has transversely disposed ribs 7, the diameter or distance between the opposite ribs being approximately that of the internal diameter of the sleeve 8 which is provided with internal threads 9 engaging the threads of the shank so that the sleeve may be rotated and caused to move longitudinally of the shank.

Near one end of the shank, there are recesses 10 and 11 preferably in stepped relation to each other and near the opposite end of the shank, there are recesses 12 and 13 which are also preferably in stepped relation to each other.

A link or coupling 14 has arms which overlap the sides of the shank at the ends, the said shank having its sides cut away to form flat surfaces 15 and 16 which engage the said arms and preferably the diameter of the combined arms and shank is slightly less than the internal diameter of the sleeve so that the sleeve may move longitudinally of the shank and telescope the arms. The said arms have lugs 17 and 18 respectively which fit into recesses of the shanks, thus preventing the link from being pulled from engagement with the shank when the sleeve encircles the arms, but the links are permitted to be disengaged from the shank by a movement transversely of the shank when the sleeve is moved to uncover the said arms, thus the said link may be disengaged from the shank and the ring 19 or other connection may be released.

The link 20 has arms 21 and 22 which are slightly longer than the arms of the link at the opposite end of the shank and the arms 21 and 22 have lugs 23 and 24 respectively which fit the recesses in the shank and the said arms are held in engagement with the shank by the sleeve which is of such length as to cover the inner ends of all of the arms when it is properly adjusted, although it may be adjusted to uncover the longer arms by first removing the link with the shorter arms and permitting the sleeve to be removed from the shank. In other words, it is the purpose of the inventor to have the parts so arranged that normally but one end will be disconnected but by going to the added trouble of completely removing the link with the short arms, all of the parts of the apparatus may be disassembled and this permits the substitution of new parts for those which may become impaired through use or accident, but the relation of the parts is such that the sleeve will not unguard the inner ends of the longer arms unless the link with the shorter arms is first removed.

I claim—

1. In a coupling for harness, a threaded shank having side recesses near its ends, a sleeve threaded on the said shank, links having arms with lugs fitted in the recesses of the said shank and guarded by the sleeve.

2. In a coupling for harness, a shank having threads and transversely disposed recesses at the sides, links embracing the ends of the shank and having portions lying in the recesses of the said shank, and a sleeve threaded on the said shank embracing the end of the links and holding them in the recesses of the shank.

3. In a coupling for harness, a threaded shank having transversely disposed recesses near each end, the said recesses at the two ends being in stepped relation to each other, a link having arms with projections extending into the said recesses, and a sleeve threaded on the said shank and adapted to embrace the ends of the said arms for holding them in the recesses.

4. In a coupling for harness, a shank having external threads and recesses in stepped relation to each other near one end of the shank and having recesses in stepped relation at points more remote from the opposite end, a link having arms with projections fitting in the first mentioned recesses, a link having arms of greater length than the arms of the first mentioned link and provided with projections lying in the recesses at the opposite end of the shank, and a sleeve threaded on the said shank for holding the arms in engagement with the shank.

HUGH J. LEONARD.

Copies of this patent may be obtained for five cents each, by addressing the "Commissioner of Patents, Washington, D. C."